Jan. 16, 1968  E. W. FISHER  3,363,918

REINFORCED EXPANSION JOINT

Filed May 27, 1965  2 Sheets-Sheet 1

INVENTOR
EDWARD W. FISHER
BY Robert Anderson
ATTORNEY

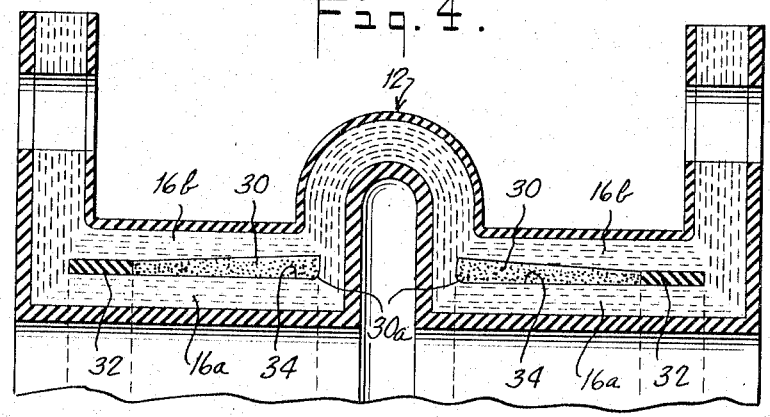
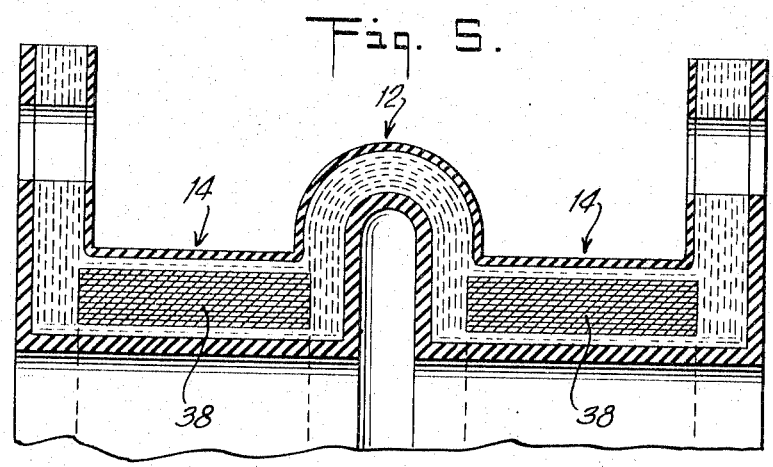

United States Patent Office 3,363,918
Patented Jan. 16, 1968

3,363,918
REINFORCED EXPANSION JOINT
Edward W. Fisher, Palmyra, N.Y., assignor to Garlock Inc., Palmyra, N.Y., a corporation of New York
Filed May 27, 1965, Ser. No. 459,374
9 Claims. (Cl. 285—229)

ABSTRACT OF THE DISCLOSURE

Elongate glass material is wound about inner fabric plies of an expansion joint to form reinforcing rings immediately adjacent to radially inner portions of a central arch of the joint to prevent radial expansion of the latter, the reinforcing rings being backed-up by masses of firm material; the mentioned prevention of radial expansion serving strongly to oppose dislocation of said rings from pressure within the joint directed both radially and axially against the joint in the area where said rings are located.

The present invention relates to flexible expansion joints such as are commonly used in pipe lines to compensate for expansion and contraction therein and to absorb vibration which is harmful to machines connected with such piping. More particularly, it relates to expansion joints which are molded of rubber, reinforced flexible rubber or other suitable elastomer material (hereinafter referred to for convenience merely as "rubber") and which have opposite end flanges for connecting the joint between two lengths of pipe or between a pipe and a machine, and an intermediate annular arch portion which is more or less U-shaped in axial-radial cross-section and facilitates axial expansion and contraction and lateral and twisting movements.

Such expansion joints are usually formed with similar cylindrical wall portions at opposite sides of the arch portion and interconnecting the latter with the mentioned end flanges. As such joints are often subjected to high internal fluid pressure, it has become common practice to reinforce the cylindrical wall portions by embedding therein rather thick and sturdy separate, continuous or endless steel rings of either round or square shape in cross-section. In the use of such expansion joints, however, substantial fluid pressure within the joint tends strongly to expand the joint's arch position axially which expansion tends very strongly to push the reinforcing rings which were located nearest to the arch portion axially outwardly toward opposite ends of the joint. In responding to this push, the reinforcing rings, particularly those nearest to the arch portion of the joint, burrow into adjacent rubber or reinforced rubber, rupturing the latter, whereafter the joint soon fails in service.

Expansion joints of the mentioned general character are commonly manufactured by first making a blank or carcass of the general shape of a finished joint and then subjecting the blank to heat for a time sufficient to cure or vulcanize the rubber therein.

Such a blank is conveniently made by winding suitable fabric, impregnated with uncured rubber, upon a mandrel which has an enlarged central annular portion giving proper internal support to the wound material to form the arch portion of the blank. The wound material at opposite sides of the arch portion is generally cylindrical, and, after winding of the inner plies of impregnated fabric material has been substantially completed to generally cylindrical shape, the reinforcing rings are slid axially onto the cylindrical winding, whereafter the free ends of the cylindrical winding are flanged radially outwardly to provide outer plies of end flanges of the finished joint for fastening the latter in place in a related pipe line. Thereafter, the outer plies of impregnated fabric are wound into place.

Each of the endless reinforcing rings hitherto employed must, as a practical matter, be made, apart from other components of the joint, by bending a length of steel stock into the form of a ring and then welding the adjacent ends together to give the ring its continuous or endless characteristic. Absent such welding, the ring, in a finished joint, would expand from the force of internal pressure in the joint and thereby fail to provide adequate reinforcement. Indeed, if the reinforcing ring is not an endless ring, its abutting ends would quickly separate and burrow into adjacent material of the joint, under internal fluid pressure in the latter, thereby causing breakdown of the joint.

At the time in the build-up of the blank, when the endless reinforcing rings are to be applied, the winding of the inner portion of the wall of rubber-impregnated fabric will have been completed. The endless rings must then be slid onto the cylindrical portions of the partial winding from opposite ends of the latter. The outer surface of the winding, at that time, however, is neither perfectly smooth nor perfectly cylindrical, but is uneven and of somewhat non-uniform diameter. As a result, an endless reinforcing ring which can be slid into place as an internal part of the blank is seldom if ever a tight fit upon underlying fabric material. This looseness of the reinforcing rings in the blank or carcass gives rise to a troublesome weakness in a finished expansion joint made from the blank.

The above-indicated difficulty cannot be satisfactorily overcome by bending a length of steel stock tightly about the partially wound blank and thereafter welding the adjacent ends of the piece of steel together to give the steel ring its necessary continuity, for the heat incident to the welding would damage and seriously weaken the wound fabric material. Hence, this welding procedure has been employed only when it could not be avoided. Thus, in the manufacture of a multiple arch expansion joint under practices hitherto followed, some of the reinforcing rings can be applied and given their continuity only by the mentioned welding procedure with some resultant damage to the fabric.

According to this invention, very strong, continuous or endless reinforcing rings are incorporated into such a blank by being seated very firmly upon and about an underlying partial winding of rubber-impregnated fabric. This is accomplished by winding a substantial plurality of turns of suitable glass strip, tape or yarn material of high tensile strength tightly upon the partial winding at the place or places on the latter where the reinforcing ring or rings are to be located in the completed expansion joint. Each of these windings should be of approximately the desired axial and radial dimensions of the reinforcing ring which it is to constitute. The glass material of which these windings are made should preferably be so coated with adhesive material of such character that adjacent turns of the winding are securely held against relative movement, thereby strongly opposing stretching or expansion of the ring and preventing weakening wear which could occur under some circumstances if adjacent turns of the winding were free to rub against each other.

The principal object of this invention is the provision of an improved expansion joint having continuous reinforcing rings of glass material therein which fit tightly upon underlying, wound fabric material and which strongly resist expansion; and a further object is the provision of an improved method of making such expansion joints.

Expansion rings comprising several embodiments of this invention are shown for illustrative purposes in the accompanying drawing in which:

FIGS. 3–5 are sectional views, generally similar in character to the upper part of FIG. 1, illustrating several other embodiments of this invention.

Figure 1:
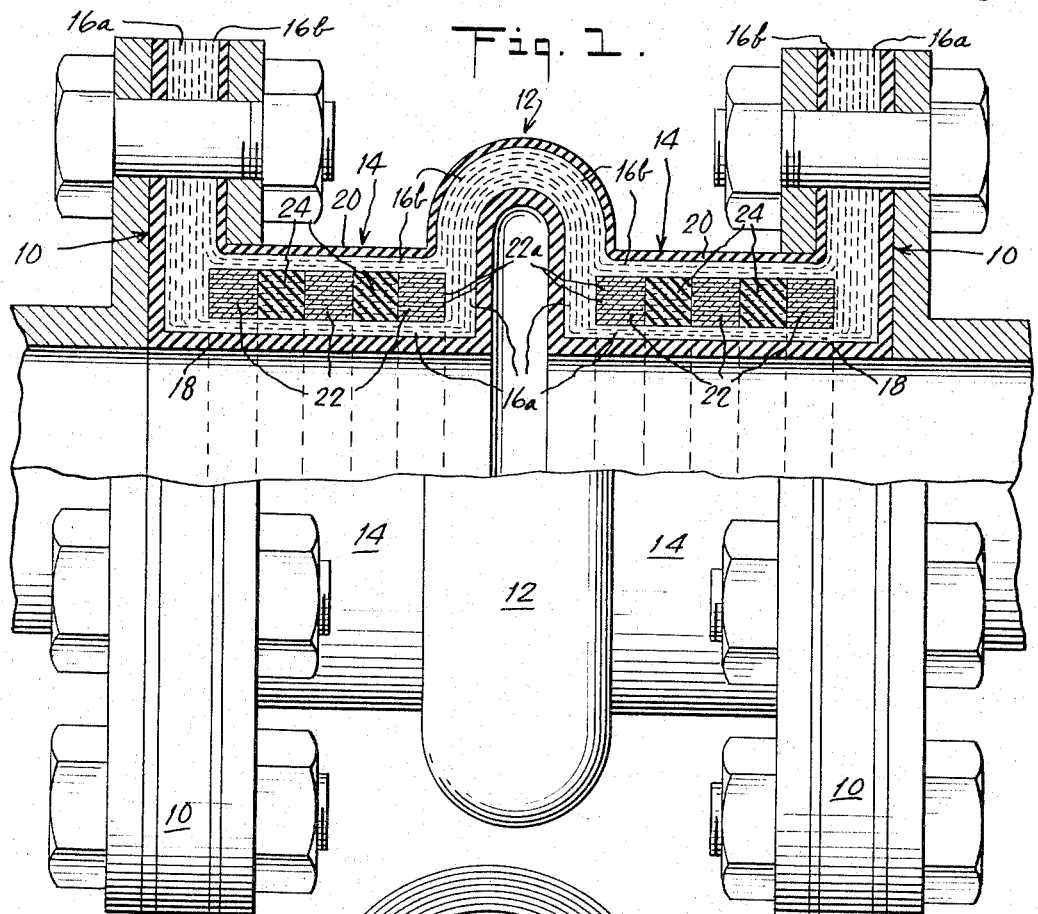
FIGURE 1 is a side view of an expansion joint according to a preferred embodiment of this invention, shown in association with fragmentary ends of two pipes which are interconnected by the said joint; the upper part of this figure being in central axial section and the lower part being in elevation.

The expansion joint illustrated in FIG. 1 consists generally of opposite, annular end flanges 10, a central, annular arch portion 12, and cylindrical portions 14 at opposite sides of the arch portion and integrally interconnecting the latter with the flanges 10.

Except for reinforcing means and means for spacing the latter, as hereinafter described, the joint comprises plural plies of suitable, strong, impregnated fabric material; said plies, numbered 16a and 16b, being formed by spirally winding rather broad webs of suitable rubber-impregnated fabric material on a mandrel of suitable shape. These plies preferably extend from the outer perimeter of one end flange 10 throughout the cylindrical portions 14 and the central arch portion 12, to the outer perimeter of the other end flange 10.

Such plies of fabric material are commonly of fabric impregnated with initially uncured rubber and ordinarily the finished joint has a rubber skin 18 covering the inner surfaces of the arch portion 12 and the cylindrical portions 14 as well as the outer faces of the end flanges 10. Similarly, a rubber skin 20 covers the outer surfaces of the arch portion 12 and the cylindrical portions 14 as well as the inner faces of the end flanges 10.

Figure 2:
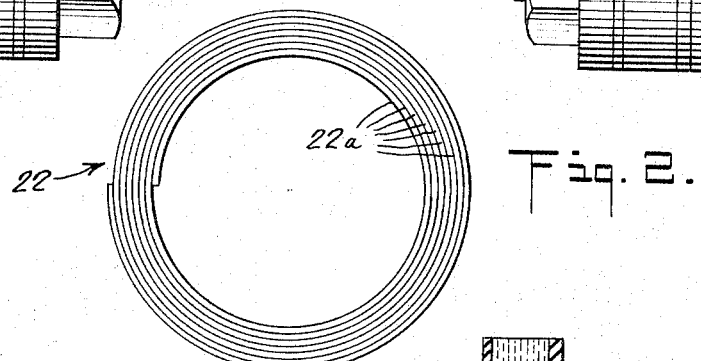
FIG. 2 is a side elevational view of a spiral winding of glass tape or strip material constituting continuous or endless reinforcing rings shown in FIG. 1.

At an intermediate stage of the winding of the fabric material during manufacture of the joint, i.e., after inner plies 16a have been wound into place on a supporting mandrel to form a partial winding, endless glass rings 22 of square or rectangular shape in cross-section are formed by tightly winding glass tape of uniform width tightly about the partial fabric winding 16a, in location approximately as shown in the drawing. Concurrently with or shortly before being thus wound, the glass tape is preferably treated for adhesion of the turns of the winding to each other by being coated with a suitable adhesive 22a, preferably an elastomer, epoxy or polyester cement, which prior to or upon subsequent curing of the joint, may become substantially unified with the glass tape and with ambient material in the joint. The tape thus wound forms an endless spiral ring such as is shown in FIG. 2, and the mentioned winding is continued until, radially of the joint, it acquires its desired thickness.

Six such endless spirally wound glass rings are shown in FIG. 1, three of such rings being spaced apart at each side of the arch portion 12 and within the cylindrical portions 14. It is to be noted that the innermost of the rings 22 at opposite sides of the arch portion 12 are located at or very close to the juncture between the arch portion and the cylindrical portions 14.

The mentioned endless glass rings are spaced apart by annuli 24 which may be of relatively firm, solid rubber, or may be windings, as illustrated, of rubber-impregnated fabric tape, and of a radial thickness about the same as the adjacent rings 22. Such wound-tape, spacing annuli 24 ordinarily would be more resistant than solid rubber to stretching from internal fluid pressure in the joint and, also, would be more flexible than solid rubber, spacing annuli.

After the rings 22 are formed at their proper locations and the annuli 24 are in place, further winding of rubber-impregnated fabric material provides outer plies 16b thereof around the outside of said rings and annuli.

After the various described parts of the joint are assembled, end-flanged and otherwise given their general configuration and interrelationship, substantially as shown in FIG. 1, they are suitably cured while being confined to their desired finished form and dimensions. Such curing may also have the effect of unifying the adhesive with the glass. Moreover, the adhesive employed may be such as to become firmly unified with the glass and ambient material irrespective of the mentioned curing step.

Figure 3:
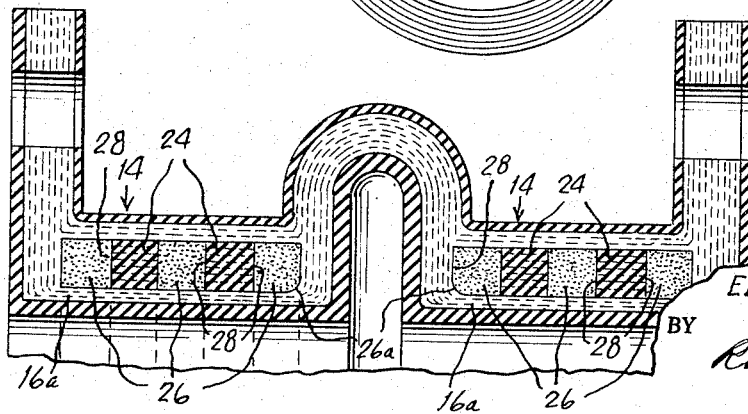

The second embodiment, illustrated in FIG. 3, differs from the previously detailed first embodiment, chiefly in that reinforcing rings 26 are formed of windings of glass cord, yarn or roving, rather than of glass tape.

In making the joint shown in FIG. 3, the spacing annuli 24 are advantageously first placed in position around the partial winding constituted by inner plies 16a. If these spacing annuli are to be of solid rubber, suitable blanks of uncured rubber are placed in proper, spaced positions upon and around the inner plies 16a of the cylindrical portions 14; or, if said spacing annuli are of wound, rubber-impregnated fabric, as illustrated, these annuli windings are wound in proper, spaced positions upon and around said inner plies 16a of the cylindrical portions 14.

The annuli 24, with adjacent portions of the plies 16a, thus form annular channels 28 for receiving the subsequently wound glass cord, yarn or roving to confine the latter, during winding, to a substantially rectangular cross-sectional area so that the eventual reinforcing rings 26 will, as preferable, be of rectangular shape in cross-section. The plies 16a defining the innermost channels 28 may advantageously impart curved inner edges 26a to the innermost rings 26 to avoid possible cutting of the latter into the adjacent plies 16a. Avoidance of such possible cutting is desirable at that point, where the joint is subjected to the greatest stresses. It should be understood that the glass cord, yarn or roving of the rings 26 are coated with suitable adhesive material similar in general characteristics to the adhesive coating applied to the glass tape of the embodiment of FIG. 1.

The third embodiment, illustrated in FIG. 4, like the described second embodiment, employs wound glass cord, yarn or roving as reinforcing means but differs from the second embodiment chiefly in providing only a single reinforcing ring 30 at each side of the arch portion 12 and a single, firm annulus 32 abutting the outer ends of each of the two rings 30. The annulus 32 may be of rubber as illustrated or may be a winding of rubber impregnated fabric tape as indicated with respect to the first and second embodiments.

By playing the rubber material for the annuli 32 in place upon the partial winding 16a, as shown in the drawing, said partial winding and annuli form annular channels 34 to receive, thereafter, the winding of suitably adhesive-coated glass cord, yarn or roving constituting the rings 30. These reinforcing rings may be so wound as to be graduated between a radially thinner outer end portion, corresponding to the radial thickness of the abutting, rubber annulus 32, and a radially thicker inner end portion where the increased thickness of the reinforcing ring 30 gives added strength where it is most needed, adjacent to the arch portion 12.

The rings 30 need not necessarily be graduated or tapered as shown but may be built up to a suitable uniform thickness to give them the necessary strength. Such graduating or tapering, however, economizes on the glass material without impairing the strength of the expansion joint. Where the glass rings 30 are tapered, the outer plies 16b of impregnated fabric are preferably complementally tapered to provide uniform over-all diameter and thickness for the cylindrical portions 14. The rings 30 may be formed with curved inner edges 30a similar to and with the same advantage mentioned with respect to the inner edges 26a of the rings 26 shown in FIG. 3.

The fourth embodiment, illustrated in FIG. 5, differs from the previously detailed expansion joints chiefly in that only a single reinforcing ring 38 is employed at each side of the arch portion 12; the rings 38 each being formed of a single winding of glass tape which is of such width that the width of the ring closely approximates the length of the cylindrical portion 14 within which it is embedded. In this embodiment the adhesive employed should be of the character indicated with respect to the first embodiment of FIG. 1. Although some latitude is permissible for the rings 38, it is, nevertheless, highly desirable that the inner ends of said rings be located at or very close to the junctures of the related cylindrical portions 14 with the arch portion 12, for it is to that point that the expansion joint is subjected to stresses, from internal fluid pressure, most strongly tending to rupture the joint.

It will be seen that, by providing spirally wound reinforcing rings in an expansion joint as hereinbefore set forth, it is possible to pursue a manufacturing procedure which enables said rings to be very tightly fitted upon underlying plies of the impregnated fabric. Additionally, however, some of the adhesive, employed as described, tends to be squeezed from between the tightly wound turns of the tape or yarn of which the reinforcing rings are formed. The squeezed-out adhesive thereupon gathers at the outside of the wound reinforcing rings thereby establishing, when cured or otherwise solidified, an irregular exterior surface of said rings which becomes bonded to surrounding material of the joint, and thereby opposes undesirable shifting of said rings.

Where reinforcing rings of glass are employed, according to this invention, they are more resistant to expansion under internal pressure than solid steel rings of similar dimensions. This is true because the glass inherently has greater tensile strength than steel. Also, where rings, of wound glass according to this invention are employed, they and an expansion joint of similar size are somewhat lighter in weight than where steel rings are employed.

Those familiar with expansion joints of the subject type will readily recognize that reinforcing rings of wound elongate glass material, as disclosed herein, possess an important advantage over solid steel rings in that the wound rings of this invention may be wound tightly upon underlying inner plies of the fabric material of the carcass while the solid steel rings must, as a practical matter, first be completely formed and then slid endwisely onto the partially formed carcass in which situation the solid steel rings usually fit rather loosely upon the underlying plies of the carcass. The rings which are tightly in position, as indicated with respect to the present invention, give rise to greater resistance of the expansion joint against becoming ruptured; hence, the present wound type of reinforcing rings constitutes a substantial improvement in the subject art.

Advantages of this invention, additional to those already mentioned, are an improved product and increased economy of manufacture. These additional advantages result from the fact that, as the reinforcing rings are wound into place instead of being slid into place, the connection flanges 10 can be formed more perfectly and more uniformly by being built up with the balance of the joint rather than by being formed as one of the later steps as hereinbefore indicated. It will be readily understood that outward flanging of plural, previously formed, plies of impregnated fabric, to form the connection flanges, is a time-consuming and costly procedure which is unnecessary under the present invention.

It will be seen that the concepts disclosed herein may be utilized in various other ways without departing from the invention as set forth in the following claims.

I claim:

1. An expansion joint comprising plural plies of rubber-impregnated fabric, forming a carcass which comprises a central, annular, axially flexible arch portion having spaced radial walls defining a radially inwardly facing pressure containing area, axially outwardly extending cylindrical members coaxially adjoining radially inner portions of said walls of the arch portion at opposite sides of the latter, annular connection means adjoining outer ends of said cylindrical members, and approximately cylindrical reinforcing means embedded within said cylindrical members; said reinforcing means comprising separate, substantially non-expansible reinforcing rings coaxial with and adjacent to said radial walls of the arch portions, and annular bodies of firm, elastomeric-inclusive material coaxial with said reinforcing rings and in abutment with axially outer sides thereof and integrally associated with ambient portions of said plies, whereby to oppose axial shifting of the reinforcing rings toward said connection means in response to pressure effective axially in said arch portion; and said reinforcing rings each consisting chiefly of a tight winding of elongate glass in intimate association with one of said plies extending within said ring.

2. An expansion joint comprising plural plies of rubber-impregnated fabric, forming a carcass which comprises an annular, axially flexible, radially extending arch member, cylindrical members coaxially adjoining said arch member at radially inner portions of opposite sides thereof, annular connection flanges adjoining outer ends of said cylindrical members and extending radially therefrom in the same radial direction as said arch member, and approximately cylindrical reinforcing means embedded within said cylindrical members; said reinforcing means comprising separate, substantially non-expansible reinforcing rings coaxially aligned with and adjacent to said radially inner portions of the arch member, and annular masses of firm, elastomeric-inclusive material coaxial with said reinforcing rings and in abutment with outer sides thereof, and integrally associated with ambient portions of said plies, whereby to oppose axial shifting of the reinforcing rings toward said connection flanges in response to pressure effective axially in said arch member; said reinforcing rings consisting chiefly of tight windings of elongate glass in tight association with one of said plies extending within said rings.

3. An expansion joint according to claim 2, said reinforcing rings each being approximately cylindrical and extending axially throughout the greater part of the length of said cylindrical member within which it is embedded.

4. An expansion joint according to claim 2, said reinforcing rings being approximately cylindrical and axially coextensive with said cylindrical member within which it is embedded, and said firm material being portions of the material of said connection flanges.

5. An expansion joint according to claim 2, said annular masses of firm material being windings of rubber-impregnated fabric.

6. An expansion joint according to claim 2, further comprising additional reinforcing rings, similar to and coaxial with those first mentioned and in intimate association with axially outer portions of said masses of firm material; and separate, additional annular masses of elastomeric-inclusive firm material coaxial with said additional reinforcing rings, in abutment with outer sides thereof, and intimately associated with ambient portions of said carcasss.

7. An expansion joint according to claim 2, said elongate glass being glass yarn.

8. An expansion joint according to claim 2, said elongate glass being glass tape.

9. An expansion joint according to claim 2, said reinforcing rings of glass having hardened adhesive material between the turns of the rings' windings, bonding said turns together to constitute the rings as solid masses.

References Cited

UNITED STATES PATENTS

| | | | |
|---|---|---|---|
| 1,696,435 | 12/1928 | Fraley | 138—121 X |
| 2,614,058 | 10/1952 | Francis | 156—171 |
| 2,692,782 | 10/1954 | Jones | 285—229 X |
| 2,878,038 | 3/1959 | Noland | 156—171 X |
| 2,879,804 | 3/1959 | Hammond | 285—229 X |
| 2,953,618 | 9/1960 | Buono et al. | 285—229 X |
| 3,137,319 | 6/1964 | St. John | 138—132 |
| 3,191,631 | 6/1965 | Smart | 138—129 |
| 3,206,228 | 9/1965 | Burrell | 285—235 X |

FOREIGN PATENTS 649,199  9/1962  Canada.

CARL W. TOMLIN, *Primary Examiner.*

THOMAS F. CALLAGHAN, *Examiner.*